(12) United States Patent
Lee et al.

(10) Patent No.: US 11,024,845 B2
(45) Date of Patent: Jun. 1, 2021

(54) MOISTURE-LIMITED ELECTRODE ACTIVE MATERIAL, MOISTURE-LIMITED ELECTRODE AND LITHIUM SECONDARY BATTERY COMPRISING THE SAME

(71) Applicant: LG CHEM, LTD., Seoul (KR)

(72) Inventors: YounKyoung Lee, Seoul (KR); SeongMin Lee, Seoul (KR); Jihyun Kim, Daejeon (KR); SooHyun Lim, Daejeon (KR); Jae Hyun Lee, Daejeon (KR); Jong Ho Jeon, Daejeon (KR)

(73) Assignee: LG Chem, Ltd. (KR)

( * ) Notice: Subject to any disclaimer, the term of this patent is extended or adjusted under 35 U.S.C. 154(b) by 737 days.

(21) Appl. No.: 13/863,623

(22) Filed: Apr. 16, 2013

(65) Prior Publication Data

US 2013/0295440 A1 Nov. 7, 2013

(30) Foreign Application Priority Data

Apr. 16, 2012 (KR) .................. 10-2012-0038925
Apr. 18, 2012 (KR) .................. 10-2012-0040130
Apr. 19, 2012 (KR) .................. 10-2012-0041117

(51) Int. Cl.
*H01M 4/485* (2010.01)
*H01M 4/04* (2006.01)
*H01M 10/0525* (2010.01)
*H01M 4/62* (2006.01)
*H01M 10/0565* (2010.01)
*H01M 4/1391* (2010.01)
*H01M 10/052* (2010.01)
*H01M 4/131* (2010.01)
*H01M 4/02* (2006.01)

(52) U.S. Cl.
CPC ............. *H01M 4/485* (2013.01); *H01M 4/04* (2013.01); *H01M 4/131* (2013.01); *H01M 4/1391* (2013.01); *H01M 4/621* (2013.01); *H01M 10/052* (2013.01); *H01M 10/0525* (2013.01); *H01M 10/0565* (2013.01); *H01M 2004/021* (2013.01); *Y10T 29/49204* (2015.01)

(58) Field of Classification Search
None
See application file for complete search history.

(56) References Cited

U.S. PATENT DOCUMENTS

| | | | |
|---|---|---|---|
| 2001/0016291 A1* | 8/2001 | Yang ................. | H01M 10/0525 429/325 |
| 2002/0031703 A1* | 3/2002 | Kameyama et al. ......... | 429/162 |
| 2004/0048151 A1* | 3/2004 | Hayashi ............... | H01M 2/263 429/162 |
| 2004/0126660 A1* | 7/2004 | Ohzuku et al. ............... | 429/223 |

(Continued)

FOREIGN PATENT DOCUMENTS

JP 2003-17054 A 1/2003
WO WO 2006/025602 A1 3/2006

*Primary Examiner* — Miriam Stagg
(74) *Attorney, Agent, or Firm* — Lerner, David, Littenberg, Krumholz & Mentlik, LLP

(57) ABSTRACT

Disclosed are an electrode active material containing moisture in an amount less than 2,000 ppm per 1 g of lithium metal oxide or moisture in an amount less than 7,000 ppm per 1 cm³ of the lithium metal oxide, and an electrode containing moisture in an amount less than 2,000 ppm per 1 cm³ of an electrode mix.

12 Claims, 1 Drawing Sheet

(56) References Cited

U.S. PATENT DOCUMENTS

| | | | | |
|---|---|---|---|---|
| 2004/0180263 A1* | 9/2004 | Kase | ...................... | C01G 53/42 |
| | | | | 429/231.3 |
| 2005/0026037 A1* | 2/2005 | Riley, Jr. | .................. | H01M 4/38 |
| | | | | 429/210 |
| 2005/0170250 A1* | 8/2005 | Ohzuku et al. | ............ | 429/231.1 |
| 2005/0186481 A1* | 8/2005 | Ogawa | .................... | H01M 4/13 |
| | | | | 429/332 |
| 2007/0231705 A1* | 10/2007 | Ohzuku | ................ | H01M 4/485 |
| | | | | 429/324 |
| 2008/0206636 A1* | 8/2008 | Sanada | ................... | H01M 2/00 |
| | | | | 429/185 |
| 2011/0189544 A1* | 8/2011 | Kim | ...................... | H01M 4/485 |
| | | | | 429/231.1 |

* cited by examiner

【FIG. 1】
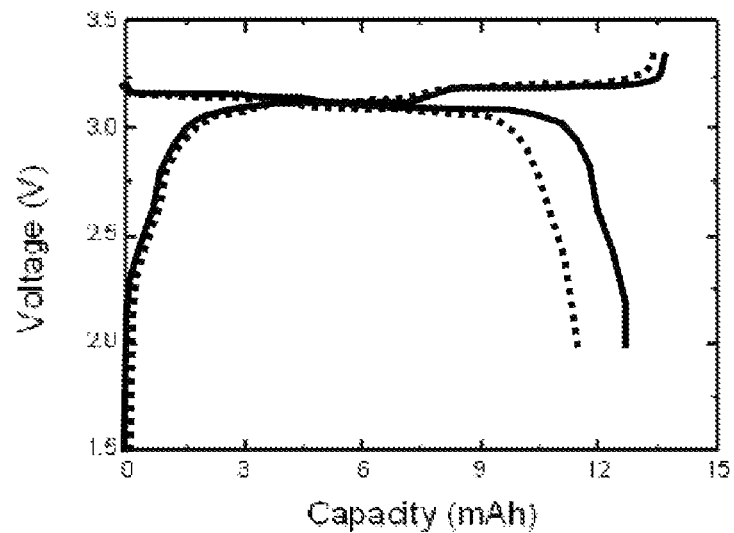
【FIG. 2】
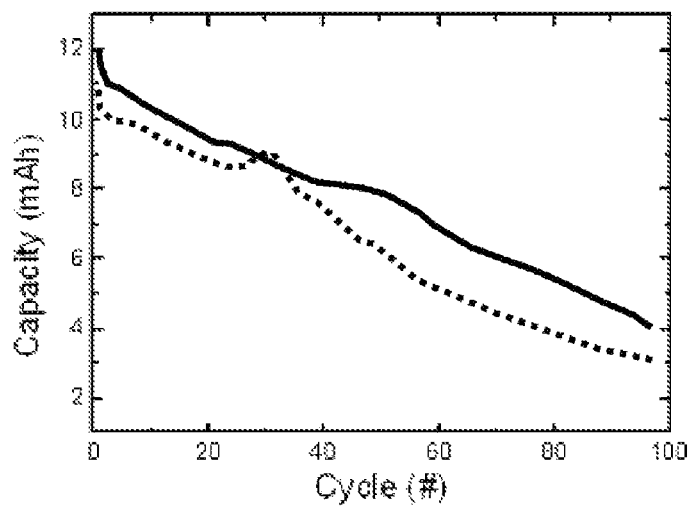

MOISTURE-LIMITED ELECTRODE ACTIVE MATERIAL, MOISTURE-LIMITED ELECTRODE AND LITHIUM SECONDARY BATTERY COMPRISING THE SAME

CROSS REFERENCE TO RELATED APPLICATIONS

This application claims priority to Korean Patent Application No. 10-2012-0038925 filed on Apr. 16, 2012, Korean Patent Application No. 10-2012-0040130 filed on Apr. 18, 2012 and Korean Patent Application No. 10-2012-0041117 filed on Apr. 19, 2012, the contents of each of which are herein incorporated by reference in their entirety.

TECHNICAL FIELD

The present invention relates to a repeatedly chargeable/dischargeable lithium secondary battery, and an electrode active material and an electrode constituting the lithium secondary battery.

BACKGROUND ART

Depletion of fuel cells has brought about a great increase in price of energy sources and increased interest in environmental pollution. Eco-friendly alternative energy sources are a necessity for the next generation. In this regard, a great deal of research into power production methods such as nuclear energy, sunlight, wind power and tidal power is underway and power storage devices for efficiently utilizing the produced energy also attract much attention.

In particular, regarding lithium secondary batteries, an increase in technological development and demand associated with mobile equipment has led to a sharp increase in demand for lithium secondary batteries as energy sources. Recently, use of lithium secondary batteries as power sources of electric vehicles (EVs) and hybrid electric vehicles (HEVs) has become popularized and usage thereof is expanding to applications such as auxiliary power supply through grid-realization.

A process for fabricating a lithium secondary battery is broadly divided into preparing an electrode material, producing an electrode, producing an electrode assembly and fabricating a battery. The production of the electrode assembly and the battery is carried out in a dry room with a controlled humidity, while the preparation of the electrode material and the production of the electrode are carried out in air.

During preparation of the electrode material and production of the electrode, moisture absorbed in the electrode material or electrode causes negative reactions in the battery and thus deterioration in battery performance. For this reason, removal of moisture is essential.

Lithium titanium oxide ($Li_4Ti_5O_{12}$) is known as a zero-strain material undergoing little structural deformation during charge/discharge, which exhibits considerably superior lifespan, does not cause generation of dendrites and has considerably superior safety and stability. In addition, lithium titanium oxide electrodes are greatly advantageous as they can be quickly charged within several minutes.

However, lithium titanium oxide absorbs moisture in air. Accordingly, an electrode fabricated using lithium titanium oxide disadvantageously generates a great amount of gas due to decomposition of moisture contained therein. This gas deteriorates battery performance.

DISCLOSURE

Technical Problem

Therefore, the present invention has been made to solve the above and other technical problems that have yet to be resolved.

It is an object of the present invention to provide a battery which exhibits improved capacity and lifespan by limiting contents of moisture in metal oxide and an electrode to a within predetermined range.

Technical Solution

In accordance with one aspect of the present invention, provided is an electrode active material for secondary batteries enabling intercalation and deintercalation of lithium ions, the electrode active material comprising lithium metal oxide.

The electrode active material contains moisture in an amount less than 2,000 ppm per 1 g of the lithium metal oxide or moisture in an amount less than 7,000 ppm per 1 $cm^3$ of the lithium metal oxide.

The inventors of the present application found that it is difficult to inhibit generation of gas, and in particular, generation of hydrogen and/or carbon dioxide, caused by negative reaction associated with moisture, when a content of moisture is 2,000 ppm or more per 1 g or 7,000 ppm or more per 1 $cm^3$.

Preferably, the electrode active material according to the present invention contains moisture in an amount not lower than 100 ppm and lower than 2,000 ppm per 1 g of lithium metal oxide, or moisture in an amount not lower than 350 ppm and lower than 7,000 ppm per 1 $cm^3$ of lithium metal oxide.

Specifically, the electrode active material may contain moisture in an amount not lower than 100 ppm and lower than 2,000 ppm, an amount not lower than 100 ppm and lower than 1,500 ppm, and an amount not lower than 100 ppm and lower than 1,000 ppm per 1 g of lithium metal oxide. More specifically, the electrode active material may contain moisture in an amount not lower than 100 ppm and lower than 500 ppm per 1 g of lithium metal oxide.

Moisture content can be determined by measuring moisture content per 1 g of lithium metal oxide or per 1 $cm^3$ of lithium metal oxide in the electrode active material made of a solid excluding the electrode current collector using a coulmetric Karl Fisher method at 400° C.

As can be seen from the Examples described later, the inventors of the present application found that an electrode comprising an electrode active material having a limited content of moisture per unit weight or per unit volume and a lithium secondary battery comprising the electrode greatly reduce generation of hydrogen ($H_2$). As a result, capacity and lifespan are improved.

A method for controlling moisture content within the range defined above is not particularly limited.

In an embodiment of the present invention, moisture can be controlled by drying the electrode active material at a temperature lower than 300° C., or mixing an electrode mix comprising the electrode active material and then drying the same at a temperature lower than a melting point of a binder, or immersing the electrode in a solvent more volatile than water and then drying the same at a temperature lower than the melting point of the binder, or immersing an electrode assembly which comprises a cathode, an anode and a polymer membrane and has a structure in which the polymer membrane is interposed between the cathode and the anode in a solvent more volatile than water and then drying the same at a temperature lower than a melting point of the polymer membrane.

The melting point of the binder is, for example, lower than 200° C. and the melting point of the polymer membrane is, for example, lower than 100° C.

Specifically, when the electrode mix is mixed with the volatile solvent, followed by drying, or the electrode is mixed with the volatile solvent, followed by drying, the drying is carried out at a temperature lower than 200° C. When the electrode assembly is immersed in the volatile solvent, drying is carried out at a temperature lower than 100° C.

In a specific embodiment of the present invention, the electrode contains moisture in an amount lower than 2,000 ppm per 1 g of the electrode mix.

Specifically, the electrode may contain moisture in an amount not lower than 100 ppm and lower than 2,000 ppm, an amount not lower than 100 ppm and lower than 1,500 ppm, and an amount not lower than 100 ppm and lower than 1,000 ppm per 1 g of the electrode mix. More specifically, the electrode active material may contain moisture in an amount not lower than 100 ppm and lower than 500 ppm per 1 g of the electrode mix.

The solvent more volatile than water is a solvent having a boiling point lower than 100° C. and examples thereof include, but are not limited to, diethyl ether, ethanol, methanol, n-propanol, isopropyl alcohol, acetone, n-pentane, ethylene dichloride, methyl acetate, ethyl acetate, acetonitrile, tetrahydrofuran (THF), n-hexane, chlorohexane, chloropentane, carbon tetrachloride, 1,2-dichloroethane, 1,2-dichloroethylene, trichloroethylene, methylethylketone and 1,2-dimethoxy ethane (DME).

The present invention provides a lithium secondary battery obtained by inserting an electrode assembly comprising a cathode, an anode and a polymer membrane interposed between the cathode and the anode into a battery case, followed by sealing. The lithium secondary battery may comprise a lithium salt-containing non-aqueous electrolyte.

The lithium secondary battery may be a lithium ion battery, a lithium ion polymer battery or a lithium polymer battery. The cathode or anode may be fabricated by a method including the following processes.

The method for producing the electrode comprises:
dispersing or dissolving a binder in a solvent to prepare a binder solution;
mixing the binder solution with an electrode active material and a conductive material to prepare an electrode mix slurry;
coating the electrode mix slurry onto a current collector;
drying the electrode; and
pressing the electrode to a predetermined thickness.

In some cases, the method may further comprise drying the pressed electrode.

In the process of preparing the binder solution, the binder solution is prepared by dispersing or dissolving the binder in the solvent.

The binder may be any binder well known in the art and, specifically, the binder may be selected from the group consisting of fluorine resins, polyolefines, styrene butadiene rubbers, carboxymethyl cellulose, mussel proteins (dopamines), silanes, ethylcellulose, methylcellulose, hydroxypropylcellulose, polyethylene glycol, polyvinyl alcohol, and acrylic copolymers.

The solvent may be selected depending on the type of binder and examples thereof include organic solvents such as isopropyl alcohol, N-methylpyrrolidone (NMP), acetone, water and the like. The solvent may comprise the aforementioned solvent more volatile than water.

In a specific embodiment of the present invention, a binder solution for a cathode may be prepared by dispersing/dissolving PVdF in N-methylpyrrolidone (NMP). A binder solution for an anode may be prepared by dispersing/dissolving styrene-butadiene rubber (SBR)/carboxy methyl cellulose (CMC) in water.

An electrode mix slurry may be prepared by mixing the electrode active material and the conductive material with the binder solution or dispersing the electrode active material and conductive material therein. The electrode mix slurry thus prepared is transported to a storage tank and stored prior to coating. The electrode mix slurry may be continuously stirred in the storage tank in order to prevent the electrode mix slurry from hardening.

Examples of the electrode active material include, but are not limited to, layered compounds such as lithium cobalt oxide ($LiCoO_2$) and lithium nickel oxide ($LiNiO_2$), or these compounds substituted by one or more transition metals; lithium manganese oxides such as compounds represented by $Li_{1+y}Mn_{2-y}O_4$ (in which $0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-y}M_yO_2$ (M=Co, Mn, Al, Cu, Fe, Mg, B or Ga, and $0.01 \leq y \leq 0.3$); lithium manganese composite oxides represented by $LiMn_{2-y}M_yO_2$ (M=Co, Ni, Fe, Cr, Zn or Ta, and $0.01 \leq y \leq 0.1$), or $Li_2Mn_3MO_8$ (M=Fe, Co, Ni, Cu or Zn); $LiMn_2O_4$ wherein Li is partially substituted by alkaline earth metal ions; disulfide compounds; $Fe_2(MoO_4)_3$; carbon such as non-graphitized carbon and graphitized carbon; metal composite oxides such as $Li_xFe_2O_3 (0 \leq x \leq 1)$, $Li_xWO_2$ ($0 \leq x \leq 1$) and $Sn_xMe_{1-x}Me'_yO_x$ (Me:Mn, Fe, Pb, Ge; Me':Al, B, P, Si, Group I, II and III elements of the Periodic Table, halogen atoms; $0 \leq x \leq 1$; $1 \leq y \leq 3$; and $1 \leq z \leq 8$); a lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

In a non-limiting embodiment of the present invention, the lithium metal oxide is preferably represented by the following Formula (1):

$$Li_aM'_bO_{4-c}A_c \quad (1)$$

wherein M' is at least one element selected from the group consisting of Ti, Sn, Cu, Pb, Sb, Zn, Fe, In, Al and Zr;
a and b are determined according to an oxidation number of M' within ranges of $0.1 \leq a \leq 4$ and $0.2 \leq b \leq 4$;
c is determined according to an oxidation number within a range of $0 \leq c < 0.2$; and
A is at least one negative univalent or bivalent anion.

The oxide of Formula (1) is represented by the following Formula (2):

$$Li_aTi_bO_4 \quad (2)$$

wherein $0.5 \leq a \leq 3$ and $1 \leq b \leq 2.5$.

The lithium metal oxide may be $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$ or the like, but is not limited thereto.

In a non-limiting embodiment of the present invention, the lithium metal oxide may be $Li_{1.33}Ti_{1.67}O_4$ or $LiTi_2O_4$. $Li_{1.33}Ti_{1.67}O_4$ has a spinel structure which undergoes little change in crystal structure during charge and discharge and is highly reversible.

The lithium metal oxide may be prepared by a method well-known in the art, for example, a solid phase method, a hydrothermal method, a sol-gel method or the like and a detailed explanation thereof is omitted.

The lithium metal oxide may be provided as a secondary particle formed of agglomerated primary particles.

The secondary particle may have a particle diameter of 200 nm to 30 μm.

When the particle diameter of the secondary particles is less than 200 nm, a high binder content is disadvantageously required to adhere the electrode to the current collector due to considerably large surface area of the secondary particles. In addition, disadvantageously, negative reaction with the electrolyte is also induced. When the particle diameter of the secondary particle exceeds 30 it is disadvantageously difficult to obtain high power due to low diffusion rate of lithium ions.

The lithium metal oxide may be present in an amount not lower than 50% by weight and not higher than 100% by weight, based on the total weight of the anode active material.

When the content of lithium metal oxide is 100% by weight, based on the total weight of the electrode active material, the electrode active material is composed of only lithium metal oxide.

In addition, in a non-limiting example of the present invention, the electrode active material may comprise lithium metal oxide having a spinel structure represented by the following Formula (3):

$$Li_xM_yMn_{2-y}O_{4-z}A_z \quad (3)$$

wherein $0.9 \leq x \leq 1.2$, $0 < y < 2$, $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one negative univalent or bivalent anion.

A maximum substitution amount of A is lower than 0.2 mol %. In a specific embodiment, A may be at least one anion selected from the group consisting of halogens such as F, Cl, Br and I, S and N.

The substitution of the anions improves bonding force to the transition metal and prevents structural deformation of the compound, thus improving lifespan of the battery. On the other hand, when a substitution amount of the anion A is excessively high (t≥0.2), lifespan characteristics may be disadvantageously deteriorated due to incomplete crystal structure formation.

Specifically, the oxide of Formula (3) may be lithium metal oxide represented by the following Formula (4):

$$Li_xNi_yMn_{2-y}O_4 \quad (4)$$

wherein $0.9 \leq x \leq 1.2$, and $0.4 \leq y \leq 0.5$.

More specifically, the lithium metal oxide may be $LiNi_{0.5}Mn_{1.5}O_4$ or $LiNi_{0.4}Mn_{1.6}O_4$.

Any conductive material may be used without particular limitation so long as it has suitable conductivity without causing adverse chemical changes in the battery. Examples of conductive materials include graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The electrode mix slurry may further comprise an additive such as a filler, as necessary.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Coating the current collector with the electrode mix slurry is a process of coating an electrode mix slurry to a given thickness on a current collector with a predetermined pattern by passing the electrode mix slurry through a coater head.

Coating the current collector with the electrode mix slurry is carried out by placing the electrode mix slurry on the current collector and then homogeneously dispersing the electrode mix slurry using a doctor blade, and coating method includes die casting, comma coating or screen printing. In addition, the electrode mix slurry may be adhered to the current collector by pressing or lamination after forming the electrode mix slurry on a separate substrate.

There is no particular limit as to the current collector, so long as it has suitable conductivity without causing adverse chemical changes in the fabricated battery. Examples of the current collector include copper, stainless steel, aluminum, nickel, titanium, sintered carbon, and copper or stainless steel which has been surface-treated with carbon, nickel, titanium or silver, and aluminum-cadmium alloys. The cathode current collector may be processed to form fine irregularities on the surface thereof so as to enhance adhesion to the cathode active materials. In addition, the cathode current collectors may be used in various forms including films, sheets, foils, nets, porous structures, foams and non-woven fabrics. Specifically, the cathode current collector may be a metal current collector including aluminum and the anode current collector may be a metal current collector including copper. The electrode current collector may be a metal foil, an aluminum (Al) foil or a copper (Cu) foil.

In the drying process, the solvent and moisture present in the slurry are removed in order to dry the slurry coated on the metal current collector. In a specific embodiment, the drying may be carried out in a vacuum oven at 50 to 300° C.

After drying, the method may further include cooling. The cooling may include slow cooling at room temperature.

After completion of coating, the electrode may be compressed to a desired thickness by passing the electrode between two rolls heated to a high temperature in order to improve capacity density of the electrode and adhesivity between the current collector and the active material. This is referred to as a pressing process.

Before passing the electrode between two rolls heated to high temperature, the electrode may be pre-heated. In the pre-heating process, the electrode is heated before being added to the roll in order to improve compression effects of the electrode.

The polymer membrane is a separator to isolate the cathode from the anode. When a solid electrolyte such as polymer is used as the electrolyte, the solid electrolyte may also serve as the separator.

As the separator, an insulating thin film having high ion permeability and mechanical strength is used. The separator typically has a pore diameter of 0.01 to 10 μm and a thickness of 5 to 300 μm.

As the separator, sheets or non-woven fabrics, or craft papers made of an olefin polymer such as polypropylene and/or glass fibers or polyethylene, which have chemical resistance and hydrophobicity, are used.

Typical examples of commercially available products for the separator may include Celgard series such as Celgard® 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase battery stability. Representative examples of the gel polymer may include polyethylene oxide, polyvinylidene fluoride and polyacrylonitrile.

The electrode assembly may include all electrode assemblies with a structure well known in the art such as jellyroll electrode assemblies (or winding-type electrode assemblies), stack electrode assemblies (or lamination-type electrode assemblies) and stack & folding electrode assemblies.

In this specification, it will be understood that the stack & folding electrode assembly includes a stack & folding-type electrode assembly produced by placing a unit cell having a structure in which a separator is interposed between the cathode and the anode on a separator sheet, and folding or winding the separator sheet.

In addition, the electrode assembly may include an electrode assembly having a structure in which the cathode and the anode are laminated by heat-fusion such that one of the cathode and the anode is interposed between separators.

As the non-aqueous electrolyte, a non-aqueous electrolytic solution, an organic solid electrolyte and an inorganic solid electrolyte may be utilized.

Examples of the non-aqueous electrolytic solution that can be used in the present invention include non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane; dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte utilized in the present invention include nitrides, halides and sulfates of lithium such as $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS), fluoro-propylene carbonate (FPC) and the like.

The lithium secondary batteries according to the present invention may be used for battery cells as power sources of small-sized devices and as unit batteries of middle- or large-sized battery modules comprising a plurality of battery cells.

Also, the present invention provides a battery pack comprising the battery module as a power source of a medium or large sized device. Preferably, examples of medium or large sized devices include electric vehicles including electric vehicles (EVs), hybrid electric vehicles (HEVs) and plug-in hybrid electric vehicles (PHEVs), and power storage systems and the like.

Configurations of battery modules and battery packs, and fabrication methods thereof are well known in the art and a detailed explanation thereof is thus omitted in this specification.

Effects of the Invention

As apparent from the fore-going, the electrode active material and the electrode according to the present invention advantageously reduce generation of hydrogen ($H_2$) caused by decomposition of moisture and improve battery performance. Accordingly, the lithium secondary battery comprising the electrode active material and the electrode exhibits improved capacity and lifespan.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a curve showing charge and discharge of batteries of exemplary Examples 1 and 2 according to the present invention; and FIG. 2 is a curve showing lifespan of batteries of exemplary Examples 1 and 2 according to the present invention.

DETAILED DESCRIPTION OF THE INVENTION

Now, the present invention will be described in more detail with reference to the following examples. These examples are provided only to illustrate the present invention and should not be construed as limiting the scope and spirit of the present invention.

Example 1

A solid containing $Li(Ni_{0.5}Mn_{1.5})O_4$ (BASF Corporation), Super-P (Timcal Corporation) and PVdF (Solef Corporation 6020) at a weight ratio of 95:5:5 was mixed with NMP as a solvent to prepare a cathode slurry. The cathode slurry was coated onto an aluminum foil with a thickness of 20 μm to produce a cathode with a load of 1 mAh/cm².

A solid consisting of $Li_{1.33}Ti_{1.67}O_4$ (Posco ESM Corporation T30) having a limited moisture content of 330 ppm/g, Super-P (Timcal Corporation) and PVdF (Solef Corporation 6020) at a weight ratio of 95:5:5 was mixed with a NMP as a solvent to produce an anode slurry. The anode slurry was coated onto an aluminum foil with a thickness of 20 μm to produce an anode with a load of 1 mAh/cm².

Moisture content can be controlled by drying $Li_{1.33}Ti_{1.67}O_4$ (Posco ESM Corporation T30) under vacuum at 130° C. for five days. Moisture content may be measured at 400° C. using a coulmetric Karl Fisher method.

A battery was produced using the cathode, the anode and an electrolyte containing a carbonate electrolyte consisting of EC:DMC:EMC at a ratio of 1:1:1, and 1M $LiPF_6$ as a salt.

Example 2

A battery was produced in the same manner as in Example 1, except that $Li_{1.33}Ti_{1.67}O_4$ (Posco ESM Corporation T30) having a limited moisture content of 900 ppm/g obtained by drying at 55° C. for 5 days was used as an anode active material.

Example 3

A solid containing $Li_{1.33}Ti_{1.67}O_4$ (Posco ESM Corporation T30), Super-P (Timcal Corporation) and PVdF (Solef Corporation 6020) at a weight ratio of 83:12:5 was mixed with NMP as a solvent to prepare an electrode mix slurry. The electrode mix slurry was coated onto an aluminum foil with a thickness of 20 μm to produce an anode with a load of 1 mAh/cm².

Example 4

An electrode assembly including 27 cathode and anode pairs was produced using the cathode of Example 1, the electrode (anode) of Example 3, and a porous polyethylene membrane (Celgard, thickness: 20 μm).

Experimental Example 1

In order to evaluate moisture content effects on battery capacity, batteries of Examples 1 and 2 were subjected to charge/discharge testing under 0.1 C charge and 0.1 C discharge conditions. Results are shown in FIG. 1. Example 1 (solid line) having a relatively low moisture content per unit weight inhibited negative reactions caused by moisture and exhibited an increase in capacity.

Experimental Example 2

In order to evaluate effects of moisture content on battery capacity, batteries of Examples 1 and 2 were charged and discharged 100 times at 25° C. under 0.1 C charge and 0.1 C discharge conditions. Results are shown in FIG. 2. Example 1 (solid line) having a relatively low moisture content per unit weight inhibited negative reactions caused by moisture and exhibited an increase in capacity.

Experimental Example 3

Moisture contents of an experimental group in which the electrode of Example 3 was immersed in 1,2-dimethoxy ethane (DME) and was dried under vacuum at 55° C. and 130° C. for 5 days, and of a control group in which the electrode was not immersed in 1,2-dimethoxy ethane (DME) and was dried under vacuum at 55° C. and 130° C. for 5 days were measured at 400° C. using a coulmetric Karl Fisher method. Results are shown in Table 1.

TABLE 1

| Drying temperature | Control group | Experimental group |
|---|---|---|
| 55° C. | 840 ppm/g | 627 ppm/g |
| 130° C. | 332 ppm/g | 312 ppm/g |

Experimental Example 4

Moisture contents of an experimental group in which the electrode of Example 4 was immersed in 1,2-dimethoxy ethane (DME) and was dried under vacuum at 55° C. for 5 days, and of a control group in which the electrode was not immersed in 1,2-dimethoxy ethane (DME) and was dried under vacuum at 55° C. for 5 days were measured at 400° C. using a coulmetric Karl Fisher method. Results are shown in Table 2. The moisture content was measured based upon the innermost electrode (electrode of Example 3).

TABLE 2

| Drying temperature: 55° C. | Control group | Experimental group |
|---|---|---|
| Electrode of Example 3 | 980 ppm/g | 822 ppm/g |
| Separator | 158 ppm/g | 132 ppm/g |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrode mix comprising:
a binder; and
an anode active material containing (a) moisture that is equal to or greater than 900 ppm and is lower than 2,000 ppm with respect to the anode active material and (b) a lithium titanium oxide that is represented by the following Formula $Li_aTi_bO_4$, in which $0.5 \leq a \leq 3$ and $1 \leq b \leq 2.5$.

2. The electrode mix according to claim 1, wherein the moisture contained in the anode active material is equal to or greater than 900 ppm and is lower than 1,500 ppm.

3. The electrode mix according to claim 1, further comprising a conductive material.

4. The electrode mix according to claim 1, wherein the lithium titanium oxide is $Li_{1.33}Ti_{1.67}O_4$ or $LiTi_2O_4$.

5. The electrode mix according to claim 1, wherein the lithium titanium oxide is provided as a secondary particle formed of agglomerated primary particles.

6. The electrode mix according to claim 5, wherein the secondary particle has a particle diameter of 200 nm to 30 μm.

7. An electrode mix comprising:
a conductive material; and
an anode active material containing (a) moisture that is equal to or greater than 900 ppm and is lower than 2,000 ppm with respect to the anode active material and (b) a lithium titanium oxide that is represented by the following Formula $Li_aTi_bO_4$, in which $0.5 \leq a \leq 3$ and $1 \leq b \leq 2.5$.

8. The electrode mix according to claim 7, further comprising a binder.

9. An anode slurry prepared by mixing the electrode mix of claim 8 with a solvent.

10. An anode electrode prepared from the slurry of claim 9.

11. An anode slurry prepared by mixing the electrode mix of claim 3 with a solvent.

12. An anode electrode prepared from the slurry of claim 11.

\* \* \* \* \*